United States Patent
Yan et al.

(10) Patent No.: US 8,667,527 B2
(45) Date of Patent: Mar. 4, 2014

(54) METHOD, APPARATUS, AND SYSTEM FOR PLAYING TARGETED ADVERTISEMENT

(71) Applicant: Huawei Technologies Co., Ltd., Guangdong (CN)

(72) Inventors: Xiaojun Yan, Nanjing (CN); Jinhui Zhang, Nanjing (CN); Hui Xia, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/622,839

(22) Filed: Sep. 19, 2012

(65) Prior Publication Data
US 2013/0024889 A1    Jan. 24, 2013

Related U.S. Application Data

(63) Continuation of application No. PCT/CN2011/074822, filed on May 28, 2011.

(30) Foreign Application Priority Data

Aug. 28, 2010   (CN) .......................... 2010 1 0265221

(51) Int. Cl.
*H04N 7/10* (2006.01)
(52) U.S. Cl.
USPC ............................................ 725/32; 725/34
(58) Field of Classification Search
USPC ...................................................... 725/32, 34
See application file for complete search history.

(56) References Cited

U.S. PATENT DOCUMENTS

| 7,512,124 | B2 * | 3/2009 | Sangroniz et al. | ............. 370/390 |
| 8,072,984 | B2 * | 12/2011 | Chang | ...................... 370/395.31 |

(Continued)

FOREIGN PATENT DOCUMENTS

| CN | 1735050 A | 2/2006 |
| CN | 101207473 A | 6/2008 |

(Continued)

OTHER PUBLICATIONS

Extended European Search Report in corresponding European Patent Application No. 11777254.1 (Dec. 13, 2012).

(Continued)

*Primary Examiner* — Pankaj Kumar
*Assistant Examiner* — Sahar Baig
(74) *Attorney, Agent, or Firm* — Leydig, Voit & Mayer, Ltd (57) ABSTRACT

Embodiments of the present invention disclose a method, an apparatus and a system for playing a targeted advertisement. An access switch receives an IGMP join packet sent by a user end, snoops the IGMP join packet, and obtains a first mapping relationship; establishes a first multicast forwarding entry according to the first mapping relationship and a pre-saved second mapping relationship between the access port and a virtual local area network of a targeted advertisement user group; and receives an advertisement media stream sent by an access router, and forwards the advertisement media stream to the targeted advertisement user group by using the access port corresponding to the virtual local area network of the targeted advertisement user group according to the first multicast forwarding entry. In this way, the problems that placing precision of a region-targeted advertisement is low and audience rating is poor in the prior art is solved.

10 Claims, 5 Drawing Sheets

(56) References Cited

U.S. PATENT DOCUMENTS

| | | | |
|---|---|---|---|
| 2002/0067730 A1 | 6/2002 | Hinderks et al. | |
| 2004/0125803 A1* | 7/2004 | Sangroniz et al. | 370/390 |
| 2005/0039205 A1 | 2/2005 | Riedl | |
| 2009/0094634 A1 | 4/2009 | Haberman et al. | |
| 2009/0119702 A1* | 5/2009 | Jagannathan et al. | 725/32 |
| 2010/0135297 A1 | 6/2010 | Brousard et al. | |
| 2010/0238924 A1* | 9/2010 | Liu | 370/390 |
| 2012/0201244 A1* | 8/2012 | Ou et al. | 370/390 |

FOREIGN PATENT DOCUMENTS

| | | |
|---|---|---|
| CN | 101262419 A | 9/2008 |
| CN | 101582785 A | 11/2009 |
| CN | 101616014 A | 12/2009 |
| CN | 101719919 A | 6/2010 |
| JP | 2007005997 A | 1/2007 |

OTHER PUBLICATIONS

Khunger, "Inserting Advertisements in IP multicast; draft-akhunger-ad-insert-multicast-00," Sep. 1, 2005, The Internet Society, Reston, Virginia.

Zhu et al., "A Novel Implementation of VLAN-Based Multicast Carried on LLID in EPON," Jun. 2007, vol. 13, No. 3, Journal of Shanghai University (Natural Science), Shanghai, China.

"SCTE 130-1 2008—Digital Program Insertion—Advertising Systems Interfaces; Part 1—Advertising Systems Overview (Informative)," Society of Cable Telecommunications Engineers, 2008, Exton, Pennsylvania.

"ANSI/SCTE 130-2 2008a—Digital Program Insertion—Advertising Systems Interfaces," Society of Cable Telecommunications Engineers, 2008, Exton, Pennsylvania.

"ANSI/SCTE 130-3 2009—Digital Program Insertion—Advertising Systems Interfaces," Society of Cable Telecommunications Engineers, 2008, Exton, Pennsylvania.

"SCTE 130-4 2009—Digital Program Insertion—Advertising Systems Interfaces," Society of Cable Telecommunications Engineers, 2008, Exton, Pennsylvania.

"ANSI/SCTE 130-7 2009—Digital Program Insertion—Advertising Systems Interfaces Part 7—Message Transport," Society of Cable Telecommunications Engineers, 2009, Exton, Pennsylvania.

Search Report in corresponding Chinese Patent Application No. 2010102652213 (Nov. 19, 2012).

Written Opinion of the International Searching Authority in corresponding International Patent Application No. PCT/CN2011/074822 (Jul. 28, 2011).

Yin, Hai-chun, "Study on Realization of Multicast Protocols on Layer 2 Switch" Oct. 2003, vol. 2, No. 4, Journal of Southern Yangtze University (Natural Science Edition), China.

2nd Office Action in corresponding Chinese Patent Application No. 201010265221.3 (Apr. 11, 2013).

International Search Report in corresponding International Patent Application No. PCT/CN2011/074822 (Jul. 28, 2011).

1st Office Action in corresponding Chinese Patent Application No. 201010265221.3 (Dec. 4, 2012).

Search Report in corresponding Chinese Patent Application No. 201010265221.3 (Nov. 19, 2012).

* cited by examiner

METHOD, APPARATUS, AND SYSTEM FOR PLAYING TARGETED ADVERTISEMENT

CROSS-REFERENCE TO RELATED APPLICATIONS

This application is a continuation of International Application No. PCT/CN2011/074822, filed on May 28, 2011, which claims priority to Chinese Patent Application No. 201010265221.3, filed on Aug. 28, 2010, both of which are hereby incorporated by reference in their entireties.

FIELD OF THE INVENTION

The present invention relates to the field of communications technologies, and in particular, to a method, an apparatus, and a system for playing a targeted advertisement.

BACKGROUND OF THE INVENTION

With development of the television network and growing pressure from the competition, in the field of program content provision, cable network operators are faced with a lot of challenges. They must deploy brand-new and customized services to meet requirements of customers, for example, implement targeted advertisement insertion by using a digital television program inserting technology.

An advertiser desires to place advertisements to specific household set-top boxes by using cable television or interactive Internet Protocol television (IPTV) according to particular attribute information of each household, such as income, race, number of members, and consumption habits, and by using the digital television program inserting technology, so that a customized advertisement is played for each household.

At present, most multi-service operators use a region-targeted advertisement mode to allow local cable or interactive IPTV operators to insert targeted advertisements in their own advertisement regions to replace nation-wide advertisements inserted between programs by using region-targeted advertisement insertion. The region-targeted advertisements may be used in cities, residential communities, or even an area with a specific population. For example, long-term health care and insurance advertisements are placed to an area populated with old residents, and programs played in college towns can include advertisements targeted at college students.

During implementation of the present invention, the inventors find that the conventional art has at least the following problems: the conventional region-targeted advertisements are all based on geographical divisions, and the same region covers a lot of households having different user attributes, but advertisements with the same content are played to the region, and placing precision of the region-targeted advertisements is low so that many users temporarily leave the television sets in the event of advertisements. Consequently, the conventional region-targeted advertisements have a low audience rating and benefits of advertisers cannot be ensured.

SUMMARY OF THE INVENTION

Embodiments of the present invention aim to provide a method, an apparatus, and a system for playing a targeted advertisement, to solve the problem that placing precision of a region-targeted advertisement is low in the conventional art.

According to a first aspect of the present invention, a method for playing a targeted advertisement is provided, the method includes:

receiving an Internet Group Management Protocol (IGMP) join packet sent by a user end, snooping the IGMP join packet, and obtaining a first mapping relationship by parsing the IGMP join packet, where the first mapping relationship includes a mapping relationship between a multicast destination media access control (MAC) address corresponding to a channel requested by the user end and an access port;

establishing a first multicast forwarding entry according to the first mapping relationship and a pre-saved second mapping relationship between the access port and a targeted advertisement user group VLAN; where the first multicast forwarding entry includes: the access port, the targeted advertisement user group VLAN, and the multicast destination MAC address corresponding to the channel requested by the user end; and receiving an advertisement media stream sent by an access router, and forwarding the advertisement media stream to the user end by using the access port corresponding to the targeted advertisement user group VLAN according to the first multicast forwarding entry.

According to a second aspect of the present invention, an apparatus for playing a targeted advertisement is provided, the apparatus includes:

a receiver, configured to receive an Internet Group Management Protocol (IGMP) join packet sent by a user end, and receive an advertisement media stream sent by an access router;

a first mapping relationship establishing unit, configured to snoop the IGMP join packet received by the receiver, and obtain a first mapping relationship by parsing the IGMP join packet, where the first mapping relationship includes: a mapping relationship between a multicast destination media access control (MAC) address corresponding to a channel requested by the user end and an access port;

a first multicast forwarding entry establishing unit, configured to establish a first multicast forwarding entry according to the first mapping relationship and a pre-saved second mapping relationship between the access port and a targeted advertisement user group VLAN; where the first multicast forwarding entry includes: the access port, the targeted advertisement user group VLAN, and the multicast destination MAC address corresponding to the channel requested by the user end; and a transmitter, configured to, when the receiver receives an advertisement media stream forwarded by the access router, forward the advertisement media stream to the targeted advertisement user group by using an access port corresponding to the virtual local area network of the targeted advertisement user group VLAN according to the first multicast forwarding entry.

According to a third aspect of the present invention, an method for playing a targeted advertisement is provided, the method includes:

receiving an Internet Group Management Protocol (IGMP) join packet by using a targeted advertisement user group VLAN and a public multicast VLAN respectively;

establishing a multicast forwarding entry according to the IGMP join packet; wherein the multicast forwarding entry comprises: a multicast destination MAC address in the IGMP join packet, a VLAN where the IGMP join packet is located, and a port having received the IGMP join packet;

splicing a program stream by using an advertisement media stream when detecting that the advertisement media stream can be forwarded;

sending the spliced program stream according to a mapping relationship pre-established between the advertisement media stream and the targeted advertisement user group VLAN.

According to a fourth aspect of the present invention, a system for playing a targeted advertisement includes an access switch and an access router, where the access switch is configured to receive an Internet Group Management Protocol (IGMP) join packet sent by a user end, snoop the IGMP join packet, and obtain a first mapping relationship by parsing the IGMP join packet, where the first mapping relationship includes a mapping relationship between a multicast destination media access control (MAC) address corresponding to a channel requested by the user end and an access port; establish a first multicast forwarding entry according to the first mapping relationship and a pre-saved second mapping relationship between the access port and a targeted advertisement user group VLAN; the first multicast forwarding entry includes: the access port, the targeted advertisement user group VLAN, and the multicast destination MAC address corresponding to the channel requested by the user end; and receive an advertisement media stream sent by an access router, and forward the advertisement media stream to the targeted advertisement user group by using an access port corresponding to the targeted advertisement user group VLAN according to the first multicast forwarding entry; and the access router is configured to pre-establish a third mapping relationship between the advertisement media stream and the targeted advertisement user group VLAN; and when detecting that the advertisement media stream can be forwarded, forward the advertisement media stream to the access switch according to the third mapping relationship.

Embodiments of the present invention include: obtaining a first mapping relationship by receiving an IGMP join packet sent by a user end, and snooping the IGMP join packet; establishing a first multicast forwarding entry according to the first mapping relationship and a pre-saved second mapping relationship between an access port and a virtual local area network of a targeted advertisement user group; and receiving an advertisement media stream sent by an access router, and forwarding the advertisement media stream to the targeted advertisement user group by using an access port corresponding to the virtual local area network of the targeted advertisement user group according to the first multicast forwarding entry. In this way, the problem that placing precision of a region-targeted advertisement is low in the prior art is solved, and the placing precision of the targeted advertisement is enhanced.

BRIEF DESCRIPTION OF THE DRAWINGS

To illustrate the technical solution in the embodiments of the present invention more clearly, the following briefly describes the accompanying drawings required for describing the embodiments. Apparently, the accompanying drawings in the following description merely show some embodiments of the present invention, and persons of ordinary skill in the art can derive other drawings from these accompanying drawings without creative efforts.

DETAILED DESCRIPTION OF THE EMBODIMENTS

The following clearly and completely describes the technical solutions according to the embodiments of the present invention with reference to the accompanying drawings in the embodiments of the present invention. Apparently, the embodiments in the following description are merely a part of rather than all the embodiments of the present invention. All other embodiments obtained by persons of ordinary skill in the art based on the embodiments of the present invention without creative efforts shall fall within the protection scope of the present invention.

Figure 1:
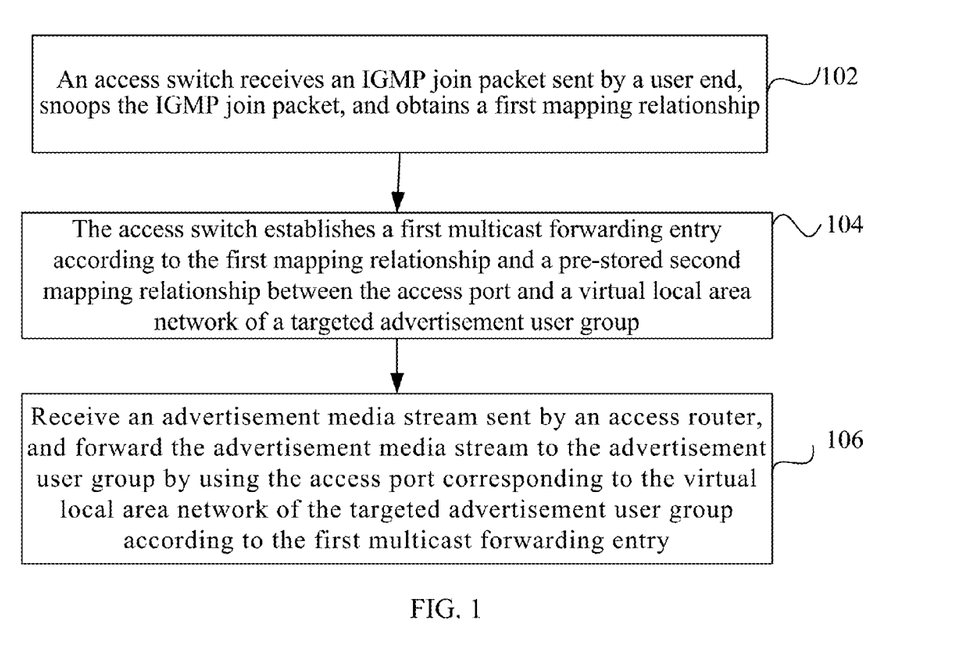
FIG. 1 is a flow chart of a method for playing a targeted advertisement according to an embodiment of the present invention.

FIG. 1 is a flow chart of a method for playing a targeted advertisement according to an embodiment of the present invention. As shown in FIG. 1, the method for playing the targeted advertisement according to the embodiment of the present invention includes the following steps.

Step S102: An access switch receives an Internet Group Management Protocol (IGMP) join packet sent by a user end, snoops the IGMP join packet, and obtains a first mapping relationship, where the first mapping relationship includes a mapping relationship between a multicast destination media access control (MAC) address corresponding to a channel requested by the user end for watching and an access port.

The access switch may be understood as an apparatus for playing the targeted advertisement. In practical networking, the access switch may be an edge access switch, and the edge access switch is a switch that is the closest to the user end.

Step S104: The access switch establishes a first multicast forwarding entry according to the first mapping relationship and a pre-saved second mapping relationship between the access port and a virtual local area network of a targeted advertisement user group; where the first multicast forwarding entry includes: the access port, the virtual local area network of the targeted advertisement user group, and the multicast destination MAC address corresponding to the channel requested by the user end for watching.

The targeted advertisement user group is a virtual user group established for meeting demands of an advertiser. A user group may be grouped by a user attribute. The user attribute includes, for example, interests of users. Users having a same interest are grouped into one virtual user group, referred to as the targeted advertisement user group. The targeted advertisement user group may also be grouped by other user attributes according to the demands of the advertiser. When the user group is grouped according to interests of users, an advertisement that all users in the group are interested in is played to these users. For example, users in targeted advertisement user group A are all interested in automobile advertisements, and users in targeted advertisement user group B are all interested in food advertisements. The virtual local area network of the targeted advertisement user group is a virtual local area network corresponding to the targeted advertisement user group, which may be indicated by a virtual local area network tag. For example, VLAN-A or VLAN-B is used to indicate a virtual local area network corresponding to the targeted advertisement user group A or the targeted advertisement user group B.

After establishing a first multicast forwarding entry, the method further includes:

The access switch establishes a second multicast forwarding entry according to the Internet Group Management Protocol (IGMP) join packet, where the second multicast forwarding entry includes: the access port, a public multicast virtual local area network, and the multicast destination MAC address corresponding to the channel requested by the user end for watching; the public multicast virtual local area network is a multicast virtual local area network to which the access port joins by default when the access port is defaulted.

After the establishing a second multicast forwarding entry, the method further includes:

the access switch duplicates the IGPM join packet; and respectively forwards the IGMP join packet in the virtual local area network of the targeted advertisement user group and the public multicast virtual local area network.

When forwarding a program stream, sent by an access router, on the channel requested by the user end, the access switch forwards the program stream to the user end according to the established second multicast forwarding entry.

Step S106: The access switch receives an advertisement media stream forwarded by the access router, and forwards the advertisement media stream to the targeted advertisement user group by using the access port corresponding to the virtual local area network of the targeted advertisement user group according to the first multicast forwarding entry.

The access router splices a program stream of the channel requested by the user end for watching by using the advertisement media stream; adds a tag of the virtual local area network of the targeted advertisement user group to the spliced program stream according to a third mapping relationship pre-established between the advertisement media stream and the virtual local area network of the targeted advertisement user group, and sends the spliced program stream, so that the access switch performs forwarding according to the tag of the virtual local area network of the targeted advertisement user group of the received spliced program stream.

The access switch receives the spliced program stream, and queries the first multicast forwarding entry according to the tag of the virtual local area network of the targeted advertisement user group of the spliced program stream, and forwards the spliced program stream to the user end.

The Embodiment of the present invention provides a method for playing a targeted advertisement, by receiving an IGMP join packet sent by a user end, snooping the IGMP join packet, and obtaining a first mapping relationship, an access switch establishes a first multicast forwarding entry according to the first mapping relationship and a pre-saved second mapping relationship between an access port and a virtual local area network of a targeted advertisement user group; and when receiving an advertisement media stream forwarded by an access router, the access switch forwards the advertisement media stream to the targeted advertisement user group by using the access port corresponding to the virtual local area network of the targeted advertisement user group according to the first multicast forwarding entry. In this way, the problem that placing precision of a region-targeted advertisement is low in the prior art is solved, and the placing precision of the targeted advertisement is enhanced.

Figure 2A:
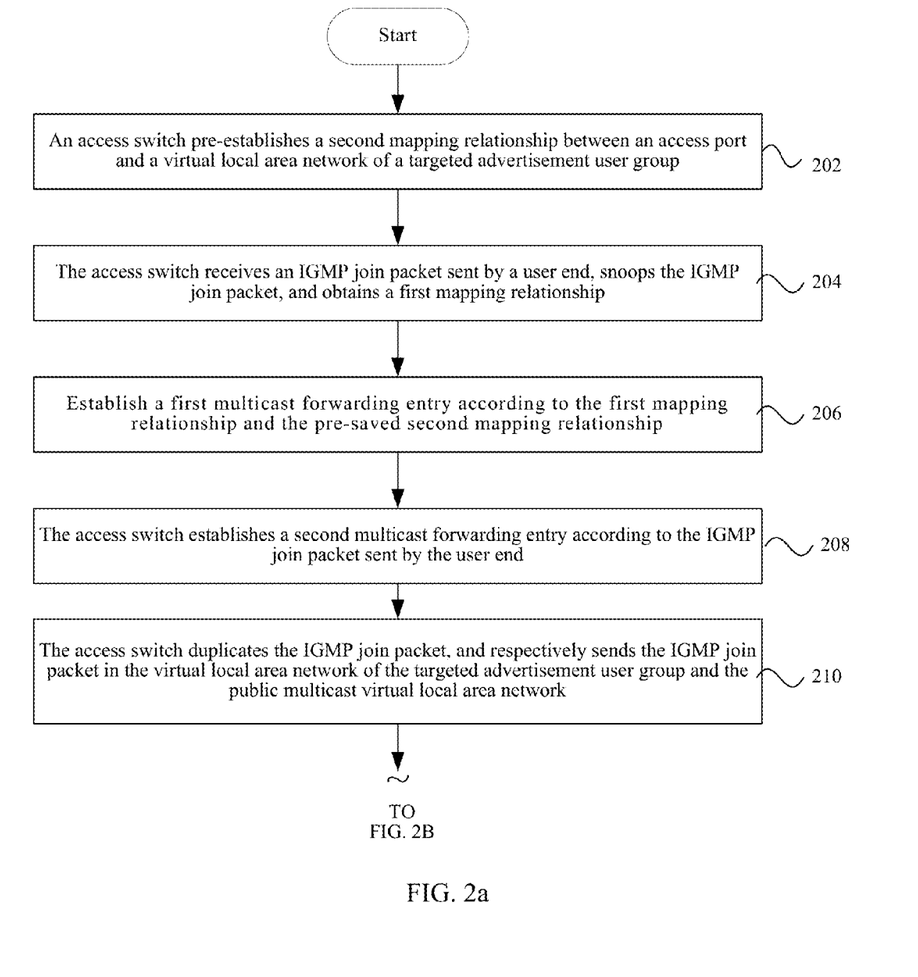
FIG. 2 is a specific flow chart of a method for playing a targeted advertisement according to an embodiment of the present invention.
Figure 2B:
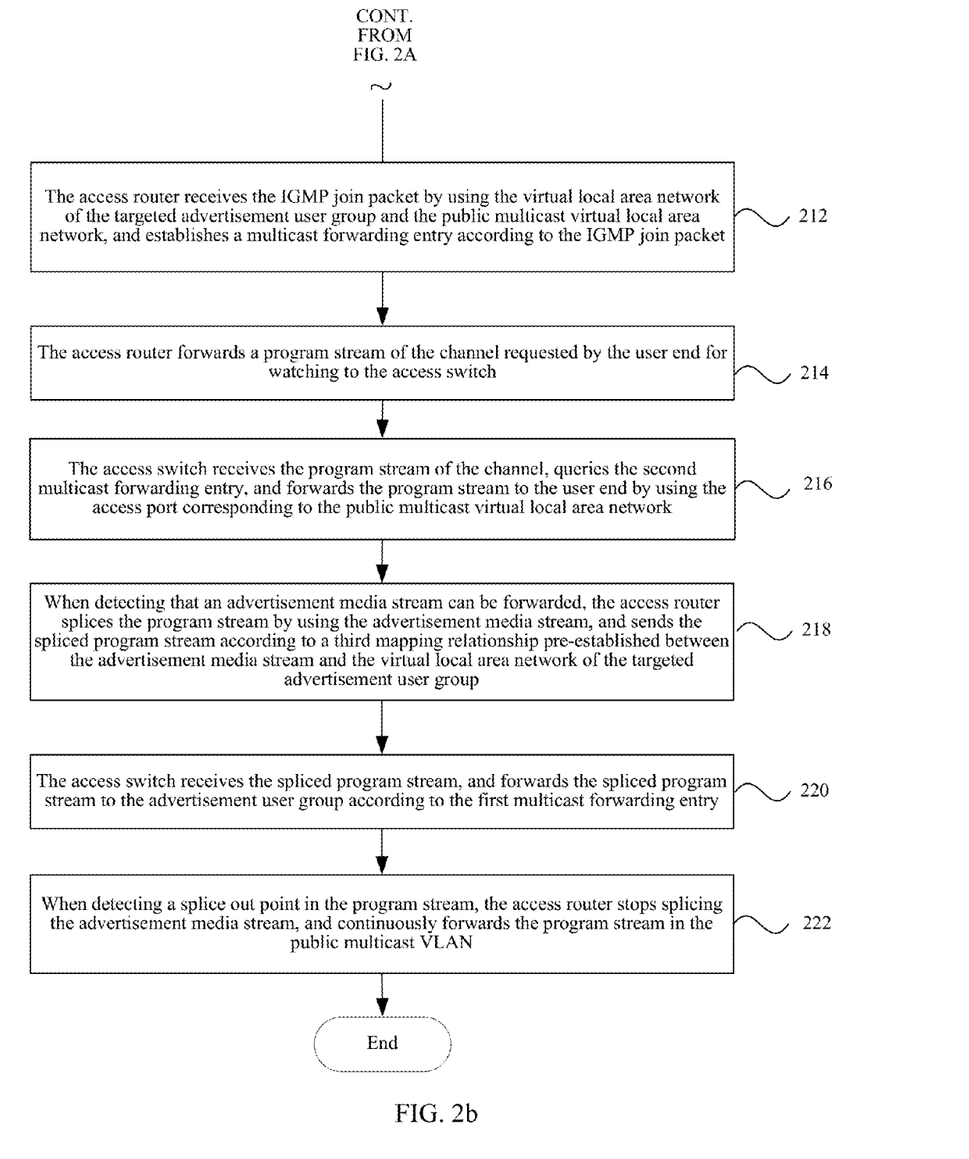

FIG. 2 is a specific flow chart of a method for playing a targeted advertisement according to an embodiment of the present invention.

Step 202: An access switch pre-establishes a second mapping relationship between an access port and a virtual local area network of a targeted advertisement user group.

The access switch may be understood as an apparatus for playing a targeted advertisement. In practical networking, the access switch may be an edge access switch, and the edge access switch is a switch that is the closest to the user end.

In practice, a user information system collects user attributes of users, and may obtain data such as household income, race, number of family members, consumption habits by making an investigation over telephone or according to registration data of users, and then groups the users into different targeted advertisement user groups according to the user attributes. Within the same user group, the advertisement attributes are the same. That is, according to the user attributes, users who are likely to watch the same type of advertisement are grouped into one group to implement binding of a user end set-top box to a targeted advertisement user group. For example, targeted advertisement user group A indicates users in this group watch automobile advertisements, and a virtual local area network corresponding to the targeted advertisement user group A is referred to as "the virtual local area network of the targeted advertisement user group A" (or as described below, the virtual local area network of the targeted advertisement user group is indicated by "targeted advertisement user group VLAN"). The user information system may also divide one targeted advertisement user group into multiple targeted advertisement user groups or combine multiple targeted advertisement user groups into one targeted advertisement user group, according to the number of users in the targeted advertisement user group or the user attributes.

The user end and the access switch are connected via the access port. The public multicast virtual local area network is a multicast virtual local area network to which the access ports joins when the access port is defaulted. In addition, when the user end is started, the user information system will collaborate with an authentication server and instruct the access switch to add the access port to the targeted advertisement user group VLAN where the user end is located, or add the access port to the targeted advertisement user group VLAN where the user end is located in a manual configuration mode. In this way, the targeted advertisement user group VLAN is bound to the access port. That is, the pre-established second mapping relationship between the access port and the virtual local area network of the targeted advertisement user group is saved. Table 1 shows the pre-established mapping relationship between the access port and the virtual local area network of the targeted advertisement user group, and a mapping relationship between the access port and a public multicast virtual local area network.

TABLE 1

| Switch | Access Port | VLAN Corresponding to the Access Port |
|---|---|---|
| S1 | S1-1 | VLAN_A |
|  |  | VLAN_public multicast |
|  | S1-2 | VLAN_B |
|  |  | VLAN_public multicast |
| S2 | S2-1 | VLAN_A |
|  |  | VLAN_public multicast |
|  | S2-2 | VLAN_C |
|  |  | VLAN_public multicast |
| S3 | S3-1 | VLAN_B |
|  |  | VLAN_public multicast |
|  | S3-2 | VLAN_C |
|  |  | VLAN_public multicast |

In Table 1, an access switch S1 has two access ports, namely S1-1 and S1-2. Access port S1-1 corresponds to virtual local area network VLAN_A corresponding to the targeted advertisement user group A, and the virtual local area network VLAN_public multicast corresponding to public multicast respectively. The VLAN_A indicates the advertisements watched by users in this targeted advertisement user group. For example, the advertisements are automobile advertisements. S1-2 corresponds to VLAN_B and VLAN_public multicast. The access ports corresponding to devices S2 and S3 may be learned following such rules.

It should be noted that, a method for inserting the targeted advertisement is inserting different advertisements according to different user attributes in different targeted advertisement user groups, when all the grouped targeted advertisement user groups watch the program stream on the same channel and the users in the targeted advertisement user groups are capable of receiving advertisements. For example, according to the user attributes, user groups are classified into targeted advertisement user group A, group B, and group C. The respectively corresponding virtual local area networks of these groups are virtual local area networks of the targeted advertisement user group, that is, VLAN_A, VLAN_B, and VLAN_C. Automobile advertisements are inserted for users in VLAN_A, real estate advertisements are inserted for users in VLAN_B, and life supplies advertisements are inserted for users in VLAN_C. When an access router detects that advertisements can be inserted, different types of advertisements are uniformly multicast according to the user attributes. That is, automobile advertisements are inserted for users in VLAN_A. When the access router detects that program streams need to be played, program streams are played for users in VLAN_A, VLAN_B, and VLAN_C.

Step 204: The access switch receives an Internet Group Management Protocol (IGMP) join packet sent by the user end, snoops the IGMP join packet, and obtains a first mapping relationship.

In the embodiment of the present invention, snooping an IGMP join packet is enabled in the public multicast VLAN and each targeted advertisement user group VLAN, and a multicast destination media access control (MAC) address corresponding to a channel requested by the user end for watching is obtained by parsing the IGMP join packet so that the first mapping relationship is obtained; where the first mapping relationship includes: the mapping relationship between the multicast destination MAC address corresponding to the channel requested by the user end for watching and the access port.

Step 206: Establish a first multicast forwarding entry according to the first mapping relationship and the pre-saved second mapping relationship.

The first multicast forwarding entry is established according to the first mapping relationship and the pre-saved second mapping relationship between the access port and the virtual local area network of the targeted advertisement user group; where the first multicast forwarding entry includes: the access port, the virtual local area network of the targeted advertisement user group, and the multicast destination MAC address corresponding to the channel requested by the user end for watching.

Step 208: The access switch establishes a second multicast forwarding entry according to the Internet Group Management Protocol (IGMP) join packet sent by the user end.

The second multicast forwarding entry includes: the access port, the public multicast virtual local area network, and the multicast destination MAC address corresponding to the channel requested by the user end for watching.

Table 2 shows a multicast forwarding table formed by the first multicast forwarding entry in steps 206 and the second multicast forwarding entry in step 208 in practice.

TABLE 2

| Switch | Access Port | VLAN Corresponding to the Access Port | Multicast Destination MAC Address |
|---|---|---|---|
| S1 | S1-1 | VLAN_A | MAC_P1 |
|  |  | VLAN_public multicast | MAC_P1 |
|  | S1-2 | VLAN_B | MAC_P2 |
|  |  | VLAN_public multicast | MAC_P2 |
| S2 | S2-1 | VLAN_A | MAC_P1 |
|  |  | VLAN_public multicast | MAC_P1 |
|  | S2-2 | VLAN_C | MAC_P2 |
|  |  | VLAN_public multicast | MAC_P2 |
| S3 | S3-1 | VLAN_B | MAC_P1 |
|  |  | VLAN_public multicast | MAC_P1 |
|  | S3-2 | VLAN_C | MAC_P2 |
|  |  | VLAN_public multicast | MAC_P2 |

As shown in FIG. 2, an access switch S1 has two access ports S1-1 and S1-2. The access port S1-1 corresponds to VLAN_A and VLAN_public multicast respectively. If a channel requested by the user end for watching is P1, the multicast destination MAC address is marked as: MAC_P1. If a user end on a port does not join any multicast group, the multicast forwarding table will not contain the port of the user end.

Step 210: The access switch duplicates the IGMP join packet, and respectively sends the IGMP join packet in the virtual local area network of the targeted advertisement user group and the public multicast virtual local area network.

Step 212: The access router receives the IGMP join packet by using the virtual local area network of the targeted advertisement user group and the public multicast virtual local area network, and establishes a multicast forwarding entry according to the IGMP join packet.

The multicast forwarding entry includes: a multicast destination MAC address in the IGMP join packet, a VLAN where the IGMP join packet is located, and a port having received the IGMP join packet.

The access router and other switches between the access router and the access switch enable the function of snooping of the Internet Group Management Protocol IGMP join packet in the public multicast VLAN and the VLAN of each targeted advertisement user group. When a user selects to watch a first channel program P1, the user end sends the IGMP join packet by using the access port, the access switch duplicates one IGMP join packet, and respectively adds a public multicast VLAN tag and a VLAN tag of a targeted advertisement user group corresponding to the access port to the two IGMP join packets, and forwards the two IGMP join packets added with tags. The access router and other switches that have snooped the IGMP join packet establish a multicast forwarding entry according to the packet. The multicast forwarding entry includes: the mapping relationship among the multicast destination MAC address in the IGMP join packet, the VLAN where the IGMP join packet is located, and the port having received the IGMP join packet.

Step 214: The access router forwards the program stream of the channel requested by the user end for watching to the access switch. The access router adds a tag of the public multicast virtual local area network to the program stream, and a destination MAC address is the multicast destination MAC address corresponding to the channel.

The access router queries a multicast forwarding entry established according to the snooped IGMP join packet, and forwards the program stream according to query result.

Other switches having snooped the IGMP join packet also query the multicast forwarding entry established according to the snooped IGMP join packet, and forward the program stream according to the query results.

Step 216: The access switch receives the program stream of the channel, queries the second multicast forwarding entry, and forwards the program stream to the user end by using the access port corresponding to the public multicast virtual local area network.

The access switch receives the program stream corresponding to the channel forwarded by the access router, queries the second multicast forwarding entry according to the tag of the public multicast virtual local area network and the multicast destination MAC address in the program stream to obtain the access port, and forwards the program stream to the corresponding user end by using the access port.

Step 218: When detecting that an advertisement media stream can be forwarded, the access router splices the program stream by using the advertisement media stream, and sends the spliced program stream according to a third mapping relationship pre-established between the advertisement media stream and the virtual local area network of the targeted advertisement user group.

When a splicer internally built in the access router detects a splice in point in the program stream, the advertisement media stream (also referred to as an advertisement media file) is obtained from an advertisement server. The spliced program stream is obtained by splicing the program stream with the advertisement media stream. The advertisement media stream may be cached in an edge router. The Splicer is configured to insert a targeted advertisement during an advertisement time period between program streams by using the deep packet inspection (DPI) technology, and forward the spliced program stream.

The access router adds a tag of a corresponding virtual local area network of the targeted advertisement user group to the spliced program stream according to the third mapping relationship pre-established between the advertisement media stream and the virtual local area network of the targeted advertisement user group, and sends the spliced program stream added with the tag to the access switch. The third mapping relationship may be obtained from the user information system, or may also be configured manually.

Step 220: The access switch receives the spliced program stream sent by the access router, and forwards the spliced program stream to the advertisement user group by using the access port corresponding to the virtual local area network of the targeted advertisement user group according to the first multicast forwarding entry.

After receiving the advertisement media stream, the access switch queries the first multicast forwarding entry according to the tag of the virtual local area network of the targeted advertisement and the multicast destination MAC address, obtains a mapping relationship between the VLAN of the targeted advertisement user group and the access port, and selects the corresponding access port to forward the spliced program stream with the VLAN tag removed.

For example, referring to Table 2, when receiving a program stream spliced by using advertisement media stream AD 1, access switch S1 and access switch S2 acquire, by querying, that the access ports of the targeted advertisement user group corresponding to advertisement media stream AD 1 are S1-1 and S2-2 according to the tags in the program stream spliced by using advertisement media stream AD 1, where the tags are VLAN_A and a destination MAC address MAC_P1, and send the program stream spliced with advertisement media stream AD 1 to the user end by using the access ports S1-1 and S2-2.

Step 222: When detecting a splice out point in the program stream, the access router stops splicing the advertisement media stream, and continuously forwards the program stream in the public multicast VLAN.

In the embodiment of the present invention, user ends having the same user attribute are configured in the same targeted advertisement user group; and targeted advertisement data stream is multicast-forwarded to the corresponding targeted advertisement user groups. In this way, the precision and accuracy of sending targeted advertisements to the user end are improved, audience rating of targeted advertisements is enhanced, and transmission load of adding transmission network is not increased.

Persons of ordinary skill in the art may understand that: when the user end sends an IGMP leave packet by using the access port, the access switch also duplicates one IGMP leave packet; the public multicast VLAN tag and the VLAN tag of the targeted advertisement user group corresponding to the access port are respectively added to the two IGMP leave packets; and forwards the two IGMP leave packets added with tags.

The embodiment of the present invention provides a method for playing a targeted advertisement, including: by receiving an IGMP join packet sent by a user end, snooping the IGMP join packet, and obtaining a first mapping relationship, the access switch establishes, a first multicast forwarding entry according to the first mapping relationship and a pre-saved second mapping relationship between the access port and a virtual local area network of a targeted advertisement user group; and when receiving an advertisement media stream forwarded by an access router, the access switch forwards the advertisement media stream to the targeted advertisement user group by using the access port corresponding to the virtual local area network of the targeted advertisement user group according to the first multicast forwarding entry. In this way, the problem that placing precision of a region-targeted advertisement is low in the prior art is solved, and the placing precision of the targeted advertisement is enhanced.

Figure 3:
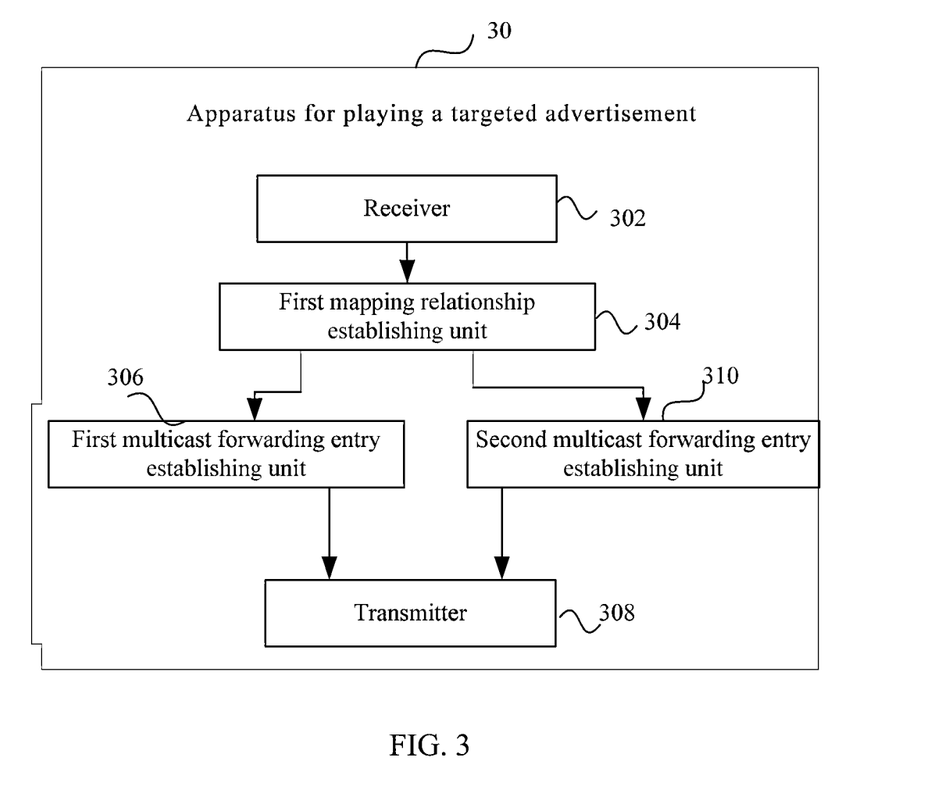
FIG. 3 is a schematic structural diagram of an apparatus for playing a targeted advertisement according to an embodiment of the present invention.

FIG. 3 is a schematic structural diagram of an apparatus for playing a targeted advertisement according to an embodiment of the present invention.

An apparatus 30 for playing a targeted advertisement includes:

a receiver 302, configured to receive an Internet Group Management Protocol (IGMP) join packet sent by a user end, and receive an advertisement media stream sent by an access router;

a first mapping relationship establishing unit 304, configured to snoop the IGMP join packet received by the receiver, and obtain a first mapping relationship, where the first mapping relationship includes: a mapping relationship between a multicast destination media access control (MAC) address corresponding to a channel requested by the user end for watching and an access port;

a first multicast forwarding entry establishing unit 306, configured to establish a first multicast forwarding entry according to the first mapping relationship and a pre-saved second mapping relationship between the access port and a virtual local area network of a targeted advertisement user group; where the first multicast forwarding entry includes: the access port, the virtual local area network of the targeted advertisement user group, and the multicast destination MAC address corresponding to the channel requested by the user end for watching; and a transmitter 308, configured to, when the receiver receives the advertisement media stream forwarded by the access router, forward the advertisement media stream to the targeted advertisement user group by using the access port corresponding to the virtual local area network of the targeted advertisement user group according to the first multicast forwarding entry.

The apparatus for playing the targeted advertisement further includes:

a second multicast forwarding entry establishing unit 310, configured to establish a second multicast forwarding entry according to the Internet Group Management Protocol (IGMP) join packet sent by the user end, where the second multicast forwarding entry includes: the access port, a public multicast virtual local area network, and the multicast destination MAC address corresponding to the channel requested by the user end for watching.

The access switch 30 receives a program stream forwarded by the access router by using the public multicast virtual local area network, and forwards the program stream to the user end according to the second multicast forwarding entry.

The targeted advertisement user group is grouped according to a user attribute. The virtual local area network of the targeted advertisement user group is a virtual local area network corresponding to the targeted advertisement user group.

The transmitter 308 is further configured to duplicate the IGMP join packet, and respectively forward the IGMP join packet in the virtual local area network of the targeted advertisement user group and the public multicast virtual local area network.

The apparatus for playing the targeted advertisement may be understood as an access switch. In practical networking, the access switch may be an edge access switch, and the edge access switch is a switch that is the closest to the user end.

The embodiment of the present invention provides an apparatus for playing a targeted advertisement. The receiver in the apparatus for playing a targeted advertisement receives an IGMP join packet sent by a user end, and receives an advertisement media stream sent by an access router. The first mapping relationship establishing unit is configured to snoop the IGMP join packet received by the receiver, and obtain a first mapping relationship. The first multicast forwarding entry establishing unit is configured to establish a first multicast forwarding entry according to the first mapping relationship and a pre-saved second mapping relationship between the access port and a virtual local area network of a targeted advertisement user group. The transmitter is configured to, when the receiver receives the advertisement media stream forwarded by the access router, forward the advertisement media stream to the targeted advertisement user group by using the access port corresponding to the virtual local area network of the targeted advertisement user group according to the first multicast forwarding entry. In this way, the problem that placing precision of a region-targeted advertisement is low in the prior art is solved, and the placing precision of the targeted advertisement is enhanced.

Figure 4:
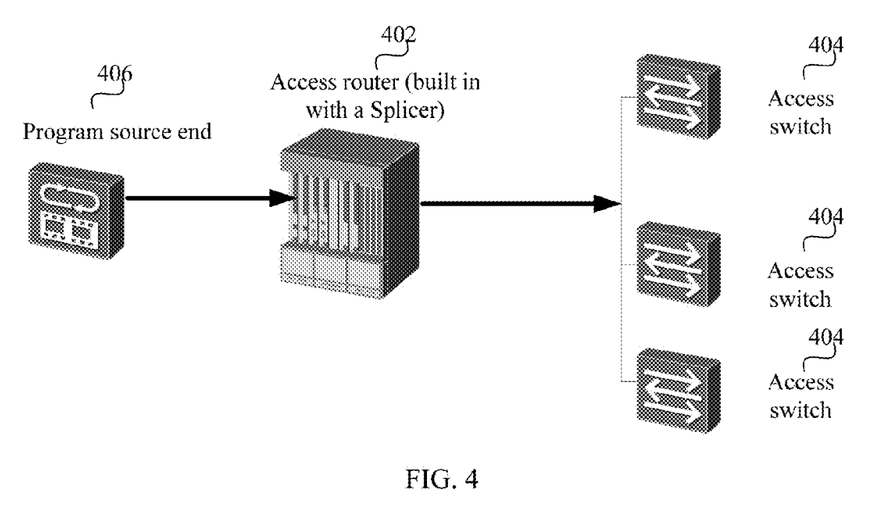
FIG. 4 is a schematic networking diagram of a system for playing a targeted advertisement according to an embodiment of the present invention.

FIG. 4 is a schematic networking diagram of a system for playing a targeted advertisement according to an embodiment of the present invention.

In a cable TV network or an IPTV network, the system includes: an access router 402 and an access switch 404.

The access switch 404 is configured to receive an Internet Group Management Protocol (IGMP) join packet sent by a user end, snoop the IGMP join packet, and obtain a first mapping relationship, where the first mapping relationship includes a mapping relationship between a multicast destination media access control (MAC) address corresponding to a channel requested by the user end for watching and an access port; establish a first multicast forwarding entry according to the first mapping relationship and a pre-saved second mapping relationship between the access port and a virtual local area network of a targeted advertisement user group; where the first multicast forwarding entry includes: the access port, the virtual local area network of the targeted advertisement user group, and the multicast destination MAC address corresponding to the channel requested by the user end for watching; and receive an advertisement media stream sent by an access router, and forward the advertisement media stream to the targeted advertisement user group by using an access port corresponding to the virtual local area network of the targeted advertisement user group according to the first multicast forwarding entry.

The access switch may be understood as an apparatus for playing a targeted advertisement. In practical networking, the access switch may be an edge access switch, and the edge access switch is a switch that is the closest to the user end.

The access switch is further configured to duplicate the IGMP join packet, and respectively forward the IGMP join packet in the virtual local area network of the targeted advertisement user group and the public multicast virtual local area network.

The access router 402 is configured to pre-establish a third mapping relationship between the advertisement media stream and the virtual local area network of the targeted advertisement user group; and when detecting that the advertisement media stream can be forwarded, forward the advertisement media stream to the access switch according to the third mapping relationship.

The access router is further configured to splice a program stream by using the advertisement media stream; add a tag of the virtual local area network of the targeted advertisement user group to the spliced program stream according to the third mapping relationship pre-established between the advertisement media stream and the virtual local area network of the targeted advertisement user group, and send the spliced program stream, so that the access switch performs forwarding according to the tag of the virtual local area network of the targeted advertisement user group of the received spliced program stream.

A Splicer is built in the access router 402. The Splicer is configured to insert a targeted advertisement during an advertisement time period between program streams by using a deep packet inspection DPI technology, and forward the spliced program stream.

The system further includes a program source end 406.

The program source end 406 is also called a head device, which is configured to send a program stream to an access router.

The embodiment of the present invention provides a system for playing a targeted advertisement. The access switch receives an IGMP join packet sent by a user end, snoops the IGMP join packet, obtains a first mapping relationship, and establishes a first multicast forwarding entry according to the first mapping relationship and a pre-saved second mapping relationship between the access port and a virtual local area network of a targeted advertisement user group. When detecting that the advertisement media stream can be forwarded, the access router splices a program stream by using the advertisement media stream; adds a tag of the virtual local area network of the targeted advertisement user group to the spliced program stream according to the third mapping relationship pre-established between the advertisement media stream and the virtual local area network of the targeted advertisement user group, and sends the spliced program stream, so that the access switch performs forwarding according to the tag of the virtual local area network of the targeted advertisement user group of the received spliced program stream. In this way, the problem that placing precision of a region-targeted advertisement is low in the prior art is solved, and the placing precision of the targeted advertisement is enhanced.

Persons of ordinary skill in the art should understand that all or a part of the steps of the methods in the embodiments may be implemented by a program instructing relevant hardware. The program may be stored in a computer readable storage medium. When the program runs, the steps of the method in the embodiments of the present invention are performed. The storage medium may be any medium that is capable of storing program codes, such as a ROM, a RAM, a magnetic disk, or a CD-ROM.

Finally, it should be noted that the above embodiments are merely intended for describing the technical solutions of the present invention other than limiting the present invention. Although the present invention is described in detail with reference to the foregoing embodiments, persons of ordinary skill in the art should understand that they can still make modifications to the technical solutions described in the foregoing embodiments, or make equivalent substitutions to some technical features thereof, without departing from the scope of the technical solutions of the embodiments of the present invention.

What is claimed is:

1. A method for playing a targeted advertisement, comprising:
   receiving an Internet Group Management Protocol (IGMP) join packet sent by a user end, snooping the IGMP join packet, and obtaining a first mapping relationship by parsing the IGMP join packet, wherein the first mapping relationship comprises a mapping relationship between a multicast destination media access control (MAC) address corresponding to a channel requested by the user end and an access port;
   establishing a first multicast forwarding entry according to the first mapping relationship and a pre-saved second mapping relationship between the access port and a targeted advertisement user group virtual local area network (VLAN); wherein the first multicast forwarding entry comprises: the access port, the targeted advertisement user group VLAN, and the multicast destination MAC address corresponding to the channel requested by the user end;
   duplicating the IGMP join packet; forwarding the IGMP join packet to the targeted advertisement user group VLAN and a public multicast VLAN; and receiving an advertisement media stream sent by an access router, and forwarding the advertisement media stream to the targeted advertisement user group by using the access port corresponding to the targeted advertisement user group VLAN according to the first multicast forwarding entry.

2. The method for playing the targeted advertisement according to claim 1, wherein after the establishing the first multicast forwarding entry, the method further comprises:
   establishing a second multicast forwarding entry according to the IGMP join packet sent by the user end, wherein the second multicast forwarding entry comprises: the access port, the public multicast VLAN, and the multicast destination MAC address corresponding to the channel requested by the user end.

3. The method for playing the targeted advertisement according to claim 1, wherein the receiving the advertisement media stream sent by the access router, and forwarding the advertisement media stream to the targeted advertisement user group by using the access port corresponding to the targeted advertisement user group VLAN according to the first multicast forwarding entry comprises:
   receiving a first program stream spliced by the access router with the advertisement media stream and a second program stream on the channel requested by the user end; and
   querying the first multicast forwarding entry according to a tag of the targeted advertisement user group VLAN of the spliced first program stream and the multicast destination MAC address, and selecting the access port corresponding to the targeted advertisement user group VLAN to forward the spliced first program stream.

4. An apparatus for playing a targeted advertisement, comprising:
   a receiver, configured to receive an Internet Group Management Protocol (IGMP) join packet sent by a user end, and receive an advertisement media stream sent by an access router;
   a first mapping relationship establishing unit, configured to snoop the IGMP join packet received by the receiver, and obtain a first mapping relationship by parsing the IGMP join packet, wherein the first mapping relationship comprises: a mapping relationship between a multicast destination media access control (MAC) address corresponding to a channel requested by the user end and an access port;
   a first multicast forwarding entry establishing unit, configured to establish a first multicast forwarding entry according to the first mapping relationship and a pre-saved second mapping relationship between the access port and a targeted advertisement user group virtual local area network (VLAN); wherein the first multicast forwarding entry comprises: the access port, the targeted advertisement user group VLAN, and the multicast destination MAC address corresponding to the channel requested by the user end; and
   a transmitter, configured to, when the receiver receives the advertisement media stream forwarded by an access router, (a) forward the advertisement media stream to the targeted advertisement user group by using the access port corresponding to the targeted advertisement user group VLAN according to the first multicast forwarding entry, (b) duplicate the IGMP loin packet, and (c) forward the IGMP loin packet to the targeted advertisement user group VLAN and a public multicast VLAN.

5. The apparatus for playing the targeted advertisement according to claim 4, further comprising:
   a second multicast forwarding entry establishing unit, configured to establish a second multicast forwarding entry according to the IGMP join packet sent by the user end, wherein the second multicast forwarding entry comprises: the access port, the public multicast VLAN, and the multicast destination MAC address corresponding to the channel requested by the user end.

6. The apparatus according to claim 4, wherein
   the receiver is configured to receive a first program stream spliced by the access router with the advertisement media stream and a second program stream on the channel requested by the user end; and
   the transmitter is configured to query the first multicast forwarding entry according to a tag of the targeted advertisement user group VLAN of the spliced first program stream and the multicast destination MAC address, and select the access port corresponding to the targeted advertisement user group VLAN to forward the spliced first program stream.

7. A method for playing a targeted advertisement, comprising: receiving an Internet Group Management Protocol (IGMP) loin packet by using a targeted advertisement user group virtual local area network (VLAN) and a public multicast VLAN; establishing a multicast forwarding entry according to the IGMP join packet; wherein the multicast forwarding entry comprises: a multicast destination MAC address in the IGMP loin packet, a VLAN where the IGMP loin packet is located, and a port having received the IGMP loin packet; splicing a program stream by using an advertisement media stream when detecting that the advertisement media stream can be forwarded; sending the spliced program stream according to a mapping relationship pre-established between the advertisement media stream and the targeted advertisement user group VLAN; stop splicing the advertisement media stream when a splice out point in the program stream is detected; and sending the program stream to the public multicast VLAN.

8. The method for playing a targeted advertisement according to claim 7, wherein the splicing the program stream by using the advertisement media stream comprises: the advertisement media stream when a splicer detects a splice in point in the program stream; and splicing the program stream with the advertisement media stream to obtain a spliced program stream.

9. A system for playing a targeted advertisement, comprising an access switch and an access router;
wherein: the access switch is configured to (a) receive an Internet Group Management Protocol (IGMP) loin packet sent by a user end,
(b) snoop the IGMP loin packet,
(c) obtain a first mapping relationship by parsing the IGMP loin packet, wherein the first mapping relationship comprises a mapping relationship between a multicast destination media access control (MAC) address corresponding to a channel requested by the user end and an access port;
(d) establish a first multicast forwarding entry according to the first mapping relationship and a pre-saved second mapping relationship between the access port and a targeted advertisement user group virtual local area network (VLAN);
wherein the first multicast forwarding entry comprises the access port, the targeted advertisement user group VLAN, and the multicast destination MAC address corresponding to the channel requested by the user end; and
(e) receive an advertisement media stream sent by an access router, and forward the advertisement media stream to the targeted advertisement user group by using the access port corresponding to the targeted advertisement user group VLAN according to the first multicast forwarding entry; and
(f) duplicate the IGMP join packet; and
(g) forward the IGMP loin packet to the targeted advertisement user group VLAN and a public multicast VLAN the access router is configured to pre-establish a third mapping relationship between the advertisement media stream and the targeted advertisement user group VLAN; and when detecting that the advertisement media stream can be forwarded, forward the advertisement media stream to the access switch according to the third mapping relationship.

10. The system according to claim 9, wherein the access router is further configured to splice a program stream on the channel requested by the user end by using the advertisement media stream; add a tag of the targeted advertisement user group VLAN to the spliced program stream according to the third mapping relationship pre-established between the advertisement media stream and the targeted advertisement user group VLAN, and send the spliced program stream, so that the access switch forwards the program stream according to the tag of the targeted advertisement user group VLAN of the received spliced program stream.

\* \* \* \* \*

UNITED STATES PATENT AND TRADEMARK OFFICE
CERTIFICATE OF CORRECTION

PATENT NO. : 8,667,527 B2
APPLICATION NO. : 13/622839
DATED : March 4, 2014
INVENTOR(S) : Yan et al.

It is certified that error appears in the above-identified patent and that said Letters Patent is hereby corrected as shown below:

*Title page, item [71], Applicant's City of Residence "Guangdong (CN)" should read --Shenzhen (CN)--.*

*In the Claims*

*Column 14, Claim 4, line 44 "IGMP loin packet" should read --IGMP join packet--.*

*Column 14, Claim 4, line 45 "IGMP loin packet" should read --IGMP join packet--.*

*Column 15, Claim 7, line 8 "IGMP loin packet" should read --IGMP join packet--.*

*Column 15, Claim 7, line 9 "loin packet" should read --join packet--.*

*Column 15, Claim 7, line 10 "loin packet" should read --join packet--.*

*Column 15, Claim 9, line 29 "(IGMP) loin" should read --(IGMP) join--.*

*Column 15, Claim 9, line 31 "IGMP loin packet" should read --IGMP join packet--.*

*Column 15, Claim 9, line 33 "loin packet" should read --join packet--.*

*Column 16, Claim 9, line 17 "IGMP loin packet" should read --IGMP join packet--.*

Signed and Sealed this
Third Day of June, 2014

Michelle K. Lee
*Deputy Director of the United States Patent and Trademark Office*